Aug. 25, 1925.
P. L. MOSES
PAN LIFTER
Filed March 12, 1923
1,551,043
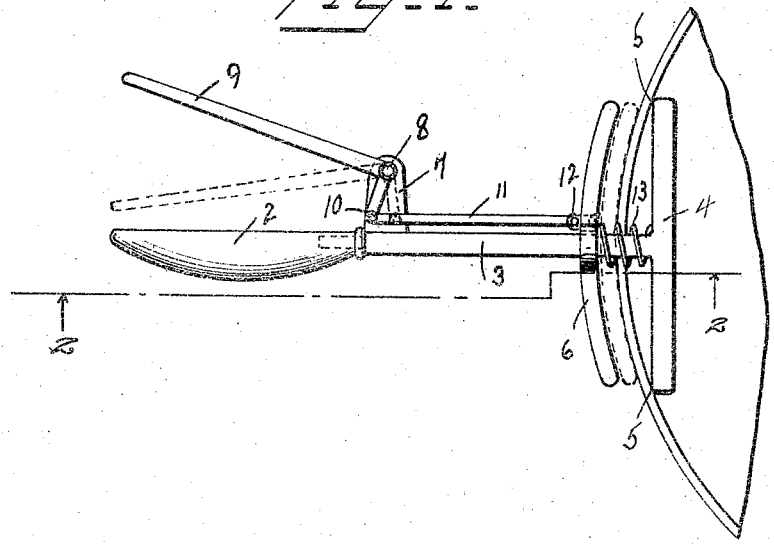
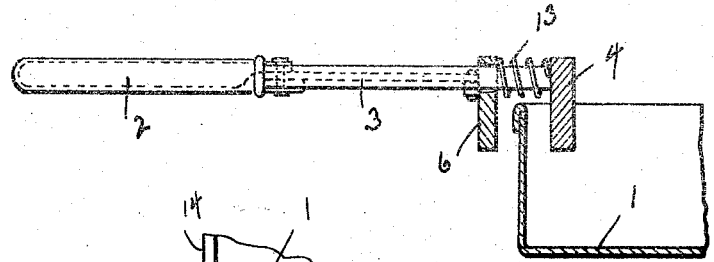
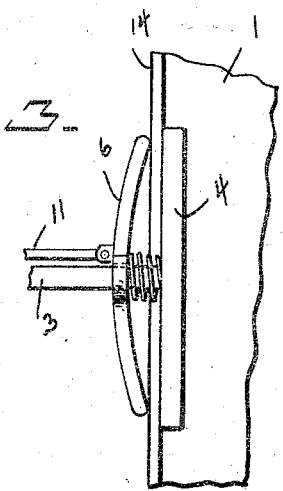
Inventor
Paul L. Moses Patented Aug. 25, 1925.

1,551,043

UNITED STATES PATENT OFFICE.

PAUL L. MOSES, OF LEXINGTON, VIRGINIA.

PAN LIFTER.

Application filed March 12, 1923. Serial No. 624,663.

*To all whom it may concern:*

Be it known that I, PAUL L. MOSES, a citizen of the United States, residing at Lexington, in the county of Rockbridge and State of Virginia, have invented certain new and useful Improvements in Pan Lifters, of which the following is a specification.

This invention relates to pan lifters and has for its prime object to provide a device of this character whereby a hot pan may be removed from an oven without the hands of the cook coming in contact with the hot pan, thus eliminating any possibility of the cooks having their hands burned or scalded in any way.

A further object of my invention is to provide a device of the above indicated character, which is quickly placed over the upper edge of a pan of any shape or design and which will firmly grip the sides of the pan, the heavier the pan is the tighter the device will grip the sides of same.

A still further object of my invention is to provide a device of the above indicated character, which is not only adjustable to any size or shape of pan, but one that will automatically release itself from the pan as soon as pressure is removed from the handle of the lifter, thus providing means whereby the tool may be quickly and easily removed from engagement with the pan after same has been removed from the oven.

And a still further object of this invention is to provide a pan lifter of the above indicated character, which is simple in construction and operation, durable, efficient for the purpose intended, and one that can be manufactured and placed on the market at a relatively low cost.

These and like objects of the invention will be better understood as the description follows and as is specifically pointed out in the appended claim.

Referring to the accompanying drawing which forms a part of this application and which clearly illustrates the construction and operation of my invention, Figure 1 is a perspective view of a pan lifter constructed in accordance with my invention.

Figure 2 is a side elevation of same, showing the lifter in position for engagement with a portion of a pan.

Figure 3 is an enlarged fragmentary section showing the pan lifter applied to a square pan.

Referring to the accompanying drawing in detail, like characters will be used to designate like parts in the different views.

In the drawing, the numeral 1 indicates a portion of a round pan to which my improved pan lifter is shown applied thereto. My improved pan lifter comprises a stationary handle 2 having a shank 3 attached thereto at one end and a stationary jaw mounted on the free end of the shank 3. The stationary jaw 4 is mounted on the shank 3 and cooperates with same to form approximately the letter T. The stationary jaw 4 is positioned within the pan 1 and bears against the sides of same as at 5. A movable jaw 6 which is curved as clearly indicated in Figure 1 to conform to the curvature of the sides of the pan 1. The shank 3 has a lug 7 formed thereon which extends upwardly therefrom and to which is pivotally mounted as at 8 an operating handle 9. One end of the operating handle which is bent at approximately right angles to the body of same is connected as at 10 with a connecting rod 11, which is in turn connected at its free end as at 12 to the movable jaw 6. A spring 13 is positioned on the shank 3 between the stationary jaw 4 and movable jaw 6 and tends to hold the two jaws in spaced relation, so that the device may be easily placed over the edge of a pan. When the device is to be placed in position as indicated in full lines, in Figure 1, the handle 9 is moved downwardly as indicated in dotted lines and the movable jaw 6 assumes the position shown in dotted lines, thus firmly gripping the outside of the pan and cooperating with the stationary jaw on the inside of the pan to provide means whereby the hot pan may be easily removed from the oven. As soon as the pan has been removed from the oven and pressure is released from the operating handle 9, the spring 13 immediately moves the jaws apart, thus permitting the device to be easily removed from the pan.

In Figure 3, I have shown a pan having square sides, as indicated by the numeral 14. It will be seen that in this instance the stationary jaw has its full face in engagement with the inner side of the pan, while the movable jaw only engages the outside of the pan at the extreme end of same.

In view of the foregoing description of my invention, it is thought that any further explanation as to the construction and operation of same is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

A pan lifter comprising a shank member having at one end a transversely disposed fixed jaw the opposite side surfaces of which are parallel with relation to each other and disposed at a right angle with relation to the median longitudinal dimension of the shank member, a longitudinally curved jaw slidably mounted upon the shank member and restrained against the turning movement upon the shank member, a spring interposed between the jaws and coils around the shank member, the shank member being provided at the sides and at the end thereof opposite that end which carries the fixed jaw with an outstanding lug, the median longitudinal dimension of the lug being parallel with the corresponding dimension of the fixed jaw, an angular handle pivotally mounted upon the lug and arranged to swing in a plane which is disposed longitudinally of both of the jaws and a connecting rod pivotally connected with the handle and the movable jaw and arranged to move longitudinally and parallel with the shank member.

In testimony whereof, I have affixed my signature.

PAUL L. MOSES.